Patented Apr. 7, 1925.

1,532,190

UNITED STATES PATENT OFFICE.

MARCEL JEAN LOUIS LEDRU AND EDOUARD JOSEPH BACHMANN, OF ROUSSILLON, FRANCE, ASSIGNORS TO SOCIETE CHIMIQUE DES USINES DU RHONE, OF PARIS, FRANCE.

PROCESS FOR THE MANUFACTURE OF ACETALDEHYDE.

No Drawing.   Application filed September 25, 1924.  Serial No. 739,798.

*To all whom it may concern:*

Be it known that we, MARCEL JEAN LOUIS LEDRU, residing at Roussillon, Isere, France, a citizen of the Republic of France, and EDOUARD JOSEPH BACHMANN, residing at Roussillon, Isere, France, a citizen of the Confederation of Switzerland, have invented certain new and useful Improvements in Processes for the Manufacture of Acetaldehyde, of which the following is a specification.

Since Kutscheroff discovered that acetylene combines with water in the presence of mercury salts to produce acetaldehyde (Berichte 14, 1540 and 1713), numerous patents have been taken for the purpose of utilizing this reaction commercially. The hydrating process discovered by Kutscheroff stops after a while owing to reduction of the mercuric salt with formation of metallic mercury. Investigators have therefore turned their efforts to extending the duration of the reaction in introducing oxygen in the reacting liquid in order to oxidize the mercuric salt as it is reduced. In certain patents (D. R. P. 292,818, 293,070 and 299,467), oxidizing agents, particularly ferric salts, are added. In others (D. R. P. 305,182), a mixture of acetylene and oxygen is passed through the solution of mercury salts. Others (D. R. P. 360,417 and 360,418) generate oxygen within the reacting mass by electrolysis of the catalytic agent; it is this latter method which is adopted in the French patent No. 491,466, but with a catalytic liquid containing ferrous sulphate in addition to the mercuric salt. The U. S. A. Patent No. 1,477,957 covers quite a similar process: the catalyst is a sulphuric acid solution of ferrous and mercuric sulphate into which oxygen is introduced either by electrolysis or under a molecular form in mixing it with the acetylene.

We have noticed that the hydration of the acetylene and its transformation into acetaldehyde are always accompanied by the formation of a little acetic acid, whatever be the catalytic agent used. This acetic acid is formed with oxygen taken from the oxygen present, whether provided by the reduction of the mercuric salt, or introduced in the molecular form, or with an oxydizing agent, or by electrolysis.

We have then sought to substitute, in the liquid, this oxygen, which is abstracted by forming acetic acid, by causing acetylene mixed with air to pass through it. We started from metallic mercury as mercurial constituent of the liquid, avoiding thereby the transformation of mercury into its salts, and we passed a stream of acetylene mixed with air through a sulphuric acid solution of ferrous sulphate containing mercury in suspension. The hourly output of acetaldehyde was small. The acetylene was badly absorbed, and the oxygen introduced reoxidized the liquid badly. We then tried to render this oxygen more active by introducing into the liquid suitable catalysts, and we have discovered the fact which constitutes our invention, namely, that copper salts are perfectly adapted for this purpose. Repeating the same experiment, that is, passing an identical mixture of acetylene and air at the same rate through the same sulphuric acid solution of ferrous sulphate in the presence of the same quantity of metallic mercury but with the addition of a copper salt, particularly copper sulphate, an abundant production of acetylene is obtained. If purified acetylene is used, the catalyst remains active as long as the absorption is made to last, and the reaction appears to be practically without limits.

This process of manufacture gives an abundant continuous and regular production of acetaldehyde; the catalyst does not need to be regenerated, and the catalytic liquid is easy to prepare since it consists of metallic mercury (and not of mercury salts) of ferrous sulphate and of copper salts.

*Example.*

In an apparatus adapted to be heated to 60°–80° C., and provided with a stirrer, are introduced the following:

4.3 kilogrammes sulphuric acid (100%), 1 kilogramme ferrous sulphate ($FeSO_4$), 0.300 kilogramme mercury, 0.150 kilogramme copper sulphate ($5H_2O$), 16 litres water.

A stream of acetylene with from 2 to 20% oxygen is bubbled through the mixture. The aldehyde and the acid formed are extracted by any suitable process. If purified acetylene is used, the hydration has no limit, provided that the mercury which may have been carried away in the vapour state by the gases is sent back into the apparatus.

What we claim and desire to secure by Letters Patent is:—

1. A process of manufacture of acetaldehyde consisting in passing a stream of acetylene and oxygen through an acid solution of ferrous sulphate in the presence of copper salts and of metallic mercury.

2. A process of manufacture of acetaldehyde consisting in passing a stream of acetaldehyde and oxygen diluted with inert gases through an acid solution of ferrous sulphate in the presence of copper salts and of metallic mercury.

3. A process of manufacture of acetaldehyde consisting in passing a stream of acetylene containing oxygen in the proportion of 2 to 20% through an acid solution of ferrous sulphate in the presence of copper salts and of metallic mercury.

4. A process of manufacture of acetaldehyde consisting in passing a stream of acetylene and oxygen through an acid solution of ferrous sulphate in the presence of copper sulphate and metallic mercury.

5. A process of manufacture of acetaldehyde consisting in passing a stream of acetylene and oxygen through an acid solution of ferrous sulphate in the presence of copper sulphate and metallic mercury heated to 60°–80° C.

In testimony whereof we have signed our names to this specification.

MARCEL JEAN LOUIS LEDRU.
EDOUARD JOSEPH BACHMANN.